Aug. 10, 1971   L. R. FLAIS   3,598,711
ELECTROCHEMICAL OXYGEN ANALYZER
Filed Nov. 15, 1967
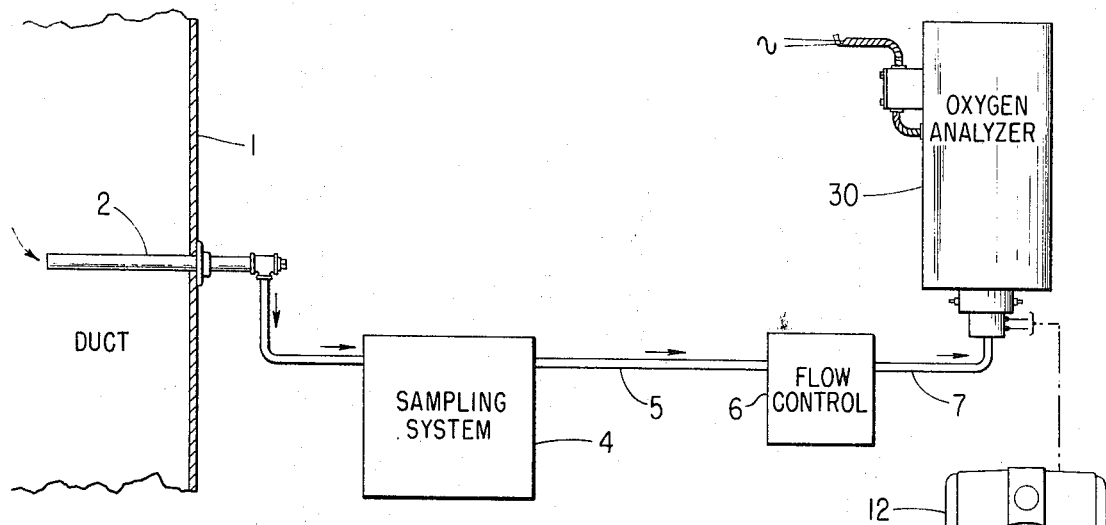
FIG. 1
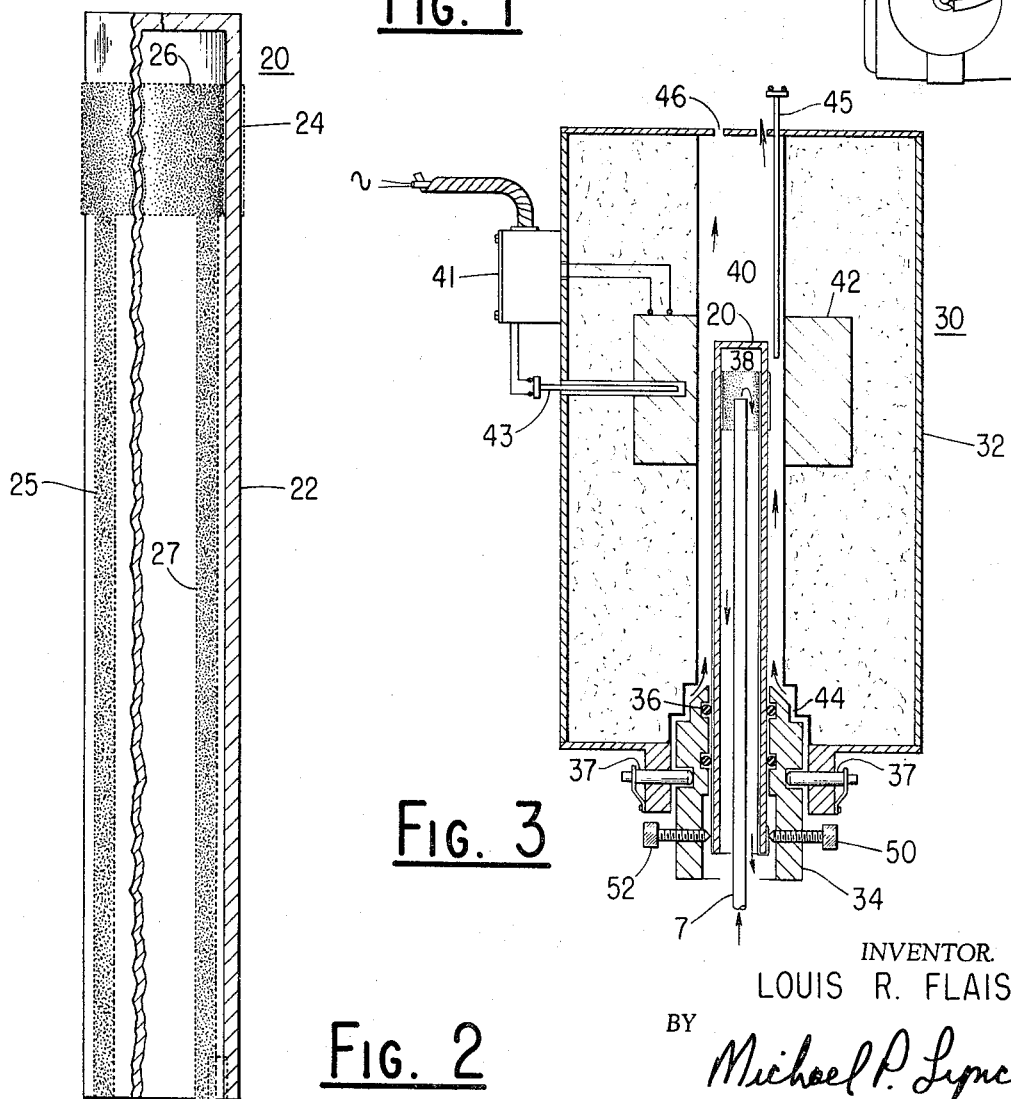
FIG. 2
FIG. 3
INVENTOR.
LOUIS R. FLAIS
BY Michael P. Lynch
ATTORNEY United States Patent Office 3,598,711
Patented Aug. 10, 1971

3,598,711
ELECTROCHEMICAL OXYGEN ANALYZER
Louis R. Flais, Alliance, Ohio, assignor to
Bailey Meter Company
Filed Nov. 15, 1967, Ser. No. 683,315
Int. Cl. G01n 27/46
U.S. Cl. 204—195
7 Claims

ABSTRACT OF THE DISCLOSURE

An electrochemical cell having a zirconium-oxide tubular electrolyte with a porous platinum electrode bonded to the inner surface of the eletrolyte tube and a similar platinum electrode bonded to the outer surface of the electrolyte tube. A platinum lead extending from each electrode transmits the cell EMF generated when the inner and outer surfaces of the electrolyte are in contact with gases having unequal concentrations of oxygen.

BACKGROUND OF THE INVENTION

Field of the invention

This invention relates to improvements in apparatus for detection and continuous measurement of the oxygen content in gases.

Description of the prior art

Various types of analyzers have been developed for determining the presence and amount of oxygen in gases. Included in the anlyzers developed to date is a concentration cell type utilizing a solid-oxide electrolyte with metallic electrode coatings on opposite sides of the electrolyte extending the full length of the electrolyte. The cell is heated to provide oxygen ion conductivity through the electrolyte, and an EMF is generated between the electrodes when the opposite sides of the electrolyte are subjected to gases of unequal oxygen concentration.

Commercially available oxygen analyzers employing such a concentration cell design provide a calibration that is empirical and dependent on the placement of the cell temperature sensor and on sample flow rate. The calibration of each analyzer must be individually determined with mixtures of gases of predetermined oxygen content. Since the entire electrode is heated, electrical contact with the electrode surfaces are made in a heated environment, thus resulting in electrical contact degradation and decreased reliability.

The electromechanical concentration cell which is the subject of this invention provides a calibration that can be calculated from a simple relationship. This is a significant improvement over the state of the art since it eliminates the need for calibration with standard gas mixtures. It also permits the range to be extended without calibration to low oxygen levels where accurate gas mixtures are not available. This is achieved with a design whose simplicity permits easy cell replacement. Reliability and accuracy of readings are improved by providing electrical contact areas that are removed from the heated portion of the cell. The design retains the inherent advantages of the solid-oxide concentration cell analyzer; namely, selectivity for oxygen or, conversely, insensitivity to background gases such as carbon dioxide, sulfur dioxide, and water vapor, and fast response.

SUMMARY OF THE INVENTOIN

The electrochemical cell which is the subject of the invention consists of zirconium-oxide solid electrolyte in the form of a tube having a first porous platinum electrode painted or otherwise bonded in the form of a band on a limited portion of the outer circumference of the electrolyte and a second similar porous platinum electrode painted or otherwise bonded on the inner circumference of the electrolyte at a location opposite the first electrode. A first narrow platinum lead from the first electrode extends the length of the electrolyte. A similar narrow platinum lead extends from the second electrode the length of the electrolyte and continues across the end of the tube to the outer surface of the electrolyte.

The minimum electrode area makes it possible to heat the area uniformly. The platinum lead strips transmit the EMF generated between the electrodes to a cool environment where it is possible to make reliable electrical contact for transmission of the cell EMF to an external load such as a recorder.

BRIEF DESCRIPTION OF THE DRAWING

FIG. 1 is a schematic illustration in functional block diagram of the basic operation of the disclosed embodiment of the invention.

FIG. 2 is a partially cross-sectional view of the electrochemical cell.

FIG. 3 is a sectioned view of an oxygen analyzer embodying the invention.

DESCRIPTION OF THE PREFERRED EMBODIMENT

Referring to FIG. 1, there is depicted, in block form, a gas analyzing system wherein a continuous sample of the gas to be measured is delivered to an analyzer by a gas sampling system. This figure shows the basic units of an apparatus capable of analyzing a gas sample for its oxygen content. What I have shown is a gas sampling system 4 which may be, for example, of the type shown in Bailey Meter Company Product Specification E65–6 which draws a gas sample from duct 1 by means of gas sampling tube 2. The sampling system 4 cleans the gas sample by water washing to remove suspended matter and deliver the gas under pressure through conduit 5 to flow control apparatus 6. A typical regulator of this type is disclosed in U.S. Pat. 2,449,485 to C. Johnson. Regulator 6 supplies a constant flow of gas sample through sample gas inlet tube 7 to gas analyzer 30. The analyzer consists of a high-temperature concentration cell which produces an electrical output signal which is a function of the absolute cell temperature and the logarithm of the ratio between the partial pressure of the oxygen in a reference gas and the partial pressure of the oxygen in the sampled gas. The EMF generated by the concentration cell, indicative of oxygen concentration of the sampled gas, is transmitted to a recorder 12 which may, for example, be calibrated to read directly in percent oxygen.

The concentration cell 20, illustrated in FIG. 2, is a high-temperature, solid-oxide cell consisting of a zirconium-oxide electrolyte tube 22 having an open end and a closed end, a porous platinum electrode 24 painted on or otherwise bonded to the outer surface of the tube 22, and a similar porous platinum electrode 26 painted on or otherwise bonded to the inner surface of the tube 22.

Platinum electrodes 24 and 26, in the form of circumferential bands of equal width are painted on opposite surfaces of the electrolyte tube 22 at a location near the closed end of the tube. Narrow platinum lead strips 25 and 27 are painted on or otherwise bonded to the tube and extend from platinum electrodes 24 and 26, respectively, to the open end of electrolyte tube 22. Lead strip 25 terminates at the open end of tube 22 while lead strip 27 continues across the end of the tube wall and onto the outer surface of the tube. The outer platinum electrode 24 and lead strip 25 are electrically insulated from platinum electrode 26 and lead strip 27 by the electrolyte tube 22. I have shown, for purposes of clarity in illustration, the electrodes 24 and 26 as well as the leads 25 and 27 of exaggerated thickness. The thickness of these, in actual practice, would be in the order of 0.15 mil.

The electrolyte tube 22 consists of zirconium-oxide stabilized by doping with an oxide such as calcium-oxide or yttrium-oxide producing a cubic-crystal structure which is mechanically stable and which exhibits low resistance to oxygen ion conduction between the platinum electrodes at elevated temperatures. When heated to a temperature of 1000 F. or higher, the electrolyte tube 22 serves as an oxygen ion conducting bridge between platinum electrodes 24 and 26, thereby permitting the electrodes to sense an oxygen concentration gradient.

Referring now to FIG. 3, I show therein the gas analyzer 30 incorporating concentration cell 20, the construction of which was discussed with reference to FIG. 2. The structure of gas analyzer 30 consists basically of an insulated cell housing 32 having a cylindrical interior cavity and a cell adapter 34. Cell adapter 34 secures the mounting of concentration cell 20 by means of O-ring seals 36 which contact cell 20 at the open end of the electrolyte tube.

Adapter 34 is secured to housing 32 by retainer pins 37. The insertion of cell 20 into the cavity in housing 32 establishes two isolated chambers, the gas sample chamber 38 within cell 20 and the reference gas chamber 40 within the housing cavity. In addition to providing a structural housing, cell housing 32 contains a cylindrical heater 42 which is so located in the cylindrical housing cavity as to heat the reference and sample chamber volumes adjacent to the platinum electrode surfaces of cell 20.

Reference gas, which may, for example, be air at atmospheric pressure, enters reference chamber 40 by natural convection of ambient air through flow passage 44 and exits from said chamber through reference air exhaust ports 46. The sample gas to be analyzed for oxygen concentration is supplied to chamber 38 by sample gas inlet tube 7 which extends longitudinally to a position adjacent to the inner platinum electrode of concentration cell 20. This position of gas sample inlet tube 7 insures the presence of sample gas in the heated volume adjacent to the inner platinum electrode. The continuous flow of sample gas is removed from analyzer 30 at the open end of concentration cell 20 which is so located as to exhaust the sample gas to the atmosphere. The use of the closed-end concentration cell 20 as mentioned above, has the advantage of isolating the sample and reference gas sides of the cell. This permits the use of low flows on both sides of the cell.

The zirconium-oxide electrolyte 22 illustrated in FIGS. 2 and 3 develops an EMF indicative of the difference in oxygen concentration between the platinum electrodes. When an oxygen concentration difference exists between the platinum electrodes of cell 20, the cell behaves like an electrochemical concentration cell and the open-circuit EMF generated is represented by the Nernst equation:

$$\text{EMF} = \frac{RT}{nF} \log \frac{P_1(O_2)}{P_2(O_2)}$$

Where
EMF=open-circuit potential
R=gas constant
T=absolute temperature
F=Faraday constant
n=number of electrons transferred in the reaction: $O_2 + 4e \rightarrow 2O^=$
$P_1(O_2)$=partial pressure of $O_2$ at one platinum electrode
$P_2(O_2)$=partial pressure of $O_2$ at other platinum electrode It is apparent from the Nernst equation that the variables determining the EMF generated are absolute temperature and oxygen partial pressure. The oxygen partial pressure at one electrode, $P_2(O_2)$, is fixed at .21 atmospheres when air at atmospheric pressure is used as the reference gas. Therefore, if a uniform temperature environment, T, is maintained, the EMF across the concentration cell electrodes will be a true indication of the oxygen partial pressure, $P_1(O_2)$, in the sample gas. It has been determined experimentally that a heater temperature above 1000 F., and preferably in the range of 1000 F.–2000 F., is necessary to make the zirconium-oxide electrolyte sufficiently conductive for the measurement of the oxygen concentration in the sample gas. In commercially available analyzers employing the solid electrolyte concentration cell, the cell output is dependent on temperature sensor location since no attempt is made to restrict the electrode area or, conversely, to maintain a uniform temperature over the full length of the electrodes.

The fuel cell discussion with reference to FIG. 2 disclosed platinum electrode bands which covered a minimum area on the inner and outer surfaces of the zirconium-oxide electrolyte near the closed end of said electrolyte; the ratio of electrolyte length to electrode length being approximately 10:1. As a result of the relative lengths of the electrodes and the elctrolyte, it is possible to restrict the active heating length of the heater 42 to the electrode surface of the electrolyte while the remainder of the electrolyte and the platinum lead strips are subjected to a much cooler environment. This novel combination of minimum electrode surface which permits concentration of heat on a limited surface of concentration cell 20 and the platinum lead strips which conduct the cell generated EMF to a cooler environment within concentration cell adapter 34 permits the use of reliable, long-life electrical connectors 50 and 52 as means to transmit the cell EMF to an external load such as a recorder or a controller.

As noted previously, in reference to the Nernst equation, an accurate representation of oxygen content in sample gas is dependent only on maintenance of a uniform, measurable temperature. The limited electrode surface design of my concentration cell, which requires heating over a small area, makes possible the uniform heating of said area by heater 42. A thermocouple such as shown at 43 accurately monitors heater 42 and provides a control signal to a heater controller 41 while thermocouple 45 accurately measures electrode environmental temperature. The capability of applying heat uniformly to the electrode surfaces and accurately measuring said temperature eliminates the need for calibration of the concentration cell with bottled gases as would be required if the electrode surfaces were such that it would not be possible to maintain a uniform electrode temperature. Therefore, since EMF of the concentration cell is a function of temperature, the EMF for various oxygen contents is directly predictable from the Nernst equation without calibration.

This discussion has been limited to one specific embodiment of my invention, but the potential applications of my concentration cell are numerous. The high temperature operation and use of a ceramic electrolyte permits the in situ mounting of the concentration cell sensor directly in the gas to be measured, if desired.

The use of air as a reference source of oxygen is merely by way of example. Selection of the reference gas and reference gas pressure depends on the range of oxygen partial pressures of the sampled gas to be covered. If, for example, it were desired to cover the range $10^{-10}$ to 1 atmosphere oxygen in a gas having a total pressure of 1 atmosphere on a single scale, it would be convenient to use oxygen as the reference gas. If, on the other hand, there was interest only in the narrow range $10^{-10}$ to $10^{-8}$ atmosphere oxygen, a reference gas having a known oxygen partial pressure of $10^{-8}$ atmosphere would be used.

The electrode selected as the reference gas electrode or the sampled gas electrode is arbitrary. For in situ applications, as an example, it would be convenient to expose the outside electrode to the sample gas. Furthermore, for the application of my concentration cell in the measurement of very small concentrations of oxygen, it might be advisable to bond the temperature monitoring thermocouple to the electrode surface thereby insuring accurate temperature measurement.

What I claim as new and desire to secure by Letters Patent of the United States is:

1. An electrochemical gas analyzer for measuring oxygen concentration in gases which comprises:

an electrolyte tube of zirconium-oxide, said tube having an open end and a closed end;

a first porous platinum electrode band bonded to the outer circumferential surface of said electrolyte tube longitudinally spaced from but adjacent to the closed end thereof, said first electrode band having a narrow longitudinal extent relative to the length of said tube;

a first platinum lead strip extending from said first porous electrode to the open end of said tube;

a second porous platinum electrode band bonded to the inner circumferential surface of said electrolyte tube longitudinally spaced from but adjacent to the closed end thereof, said second electrode band having substantially the same longitudinal extent as said first electrode band;

a second platinum lead strip extending from said second porous electrode to the open end of said tube;

means for supplying a gas having a known concentration of oxygen to one electrode surface; and means for supplying a gas of unknown oxygen concentration to the other electrode surface whereby the zirconium-oxide tube acts as an electrical insulator between the first porous electrode and the first lead strip and the second porous electrode and second lead strip while permitting an EMF to be generated between the electrodes directly proportional to the absolute temperature of the cell and the ratio between the oxygen partial pressure at one electrode and the oxygen partial pressure at the other electrode.

2. An electrochemical gas analyzer for measuring oxygen concentration as claimed in claim 1 further including a heater at a location adjacent to said first and second electrodes.

3. An electrochemical gas analyzer for measuring oxygen concentration as claimed in claim 2 further including a thermostat for maintaining the temperature of said electrodes constant at a predetermined value within the range of 1000 F. to 2000 F.

4. An electrochemical gas analyzer for measuring oxygen concentration as claimed in claim 3 further including:

a first electrical connector in contact with the first platinum lead strip at a location near the open end of the electrolyte tube; and a second electrical connector in contact with the second platinum lead strip at a location near the open end of the electrolyte tube whereby the EMF generated between the first and second electrodes is conducted from the lead strips at an electrolyte tube location which is not affected by the heater and means for measuring the EMF between said first and second connectors.

5. An electrochemical gas analyzer for measuring oxygen concentration in gases, which comprises:

an electrolyte tube of zirconium-oxide, said tube having an open end and a closed end, said tube forming interior and exterior longitudinal supporting surfaces;

a first circumferential electrode band of porous platinum bonded to one of the longitudinal supporting surfaces proximate to but spaced from the closed end of said tube, said first electrode band having a narrow longitudinal extent relative to the length of said tube;

a second circumferential electrode band of porous platinum bonded to the other of the longitudinal supporting surfaces proximate to but spaced from the closed end of the said tube, said second electrode band having substantially the same longitudinal extent as said first electrode band;

a first platinum lead strip extending from said first electrode band, along the associated longitudinal supporting surface, to the open end of said tube;

a second platinum lead strip extending from said second electrode band, along the associated longitudinal supporting surface, to the open end of said tube;

means for supplying a reference gas having a known concentration of oxygen to said first electrode band; and, means for supplying a sample gas of unknown oxygen concentration to said second electrode band.

6. The electrochemical gas analyzer of claim 5, further including means for maintaining the zone defined by the surface area of said electrode bands, at a predetermined temperature at which oxygen ion conduction proceeds between said electrodes.

7. The electrochemical gas analyzer of claim 6, wherein said means for supplying a sample gas includes a conduit extending into the open end of said tube so that the sample gas egresses from said conduit in the zone of said electrode bands.

References Cited

UNITED STATES PATENTS

| | | | |
|---|---|---|---|
| 3,216,911 | 11/1965 | Kronenberg | 136—86 |
| 3,297,551 | 1/1967 | Alcock | 204—1.1 |
| 3,347,767 | 10/1967 | Hickam | 204—195 |
| 3,359,188 | 12/1967 | Fischer | 204—1.1 |
| 3,378,478 | 4/1968 | Kolodney et al. | 204—1.1 |
| 3,400,054 | 9/1968 | Ruka et al. | 204—1.1 |
| 3,454,486 | 7/1969 | Davies | 204—195 |
| 3,481,855 | 12/1969 | Kolodney et al. | 204—195 |

References Cited

UNITED STATES PATENTS

| | | | |
|---|---|---|---|
| 1,081,545 | 8/1967 | Great Britain | 204—195 |

TA-HSUNG TUNG, Primary Examiner

U.S. Cl. X.R.

136—86, 153